Aug. 14, 1956 P. G. SMITH ET AL 2,759,154
WAVEGUIDE HYBRID NETWORK FOR MONOPULSE COMPARATOR
Filed Nov. 10, 1954 4 Sheets-Sheet 1

INVENTORS
P. GENE SMITH
BY CHARLES E. BROCKNER
ATTORNEY

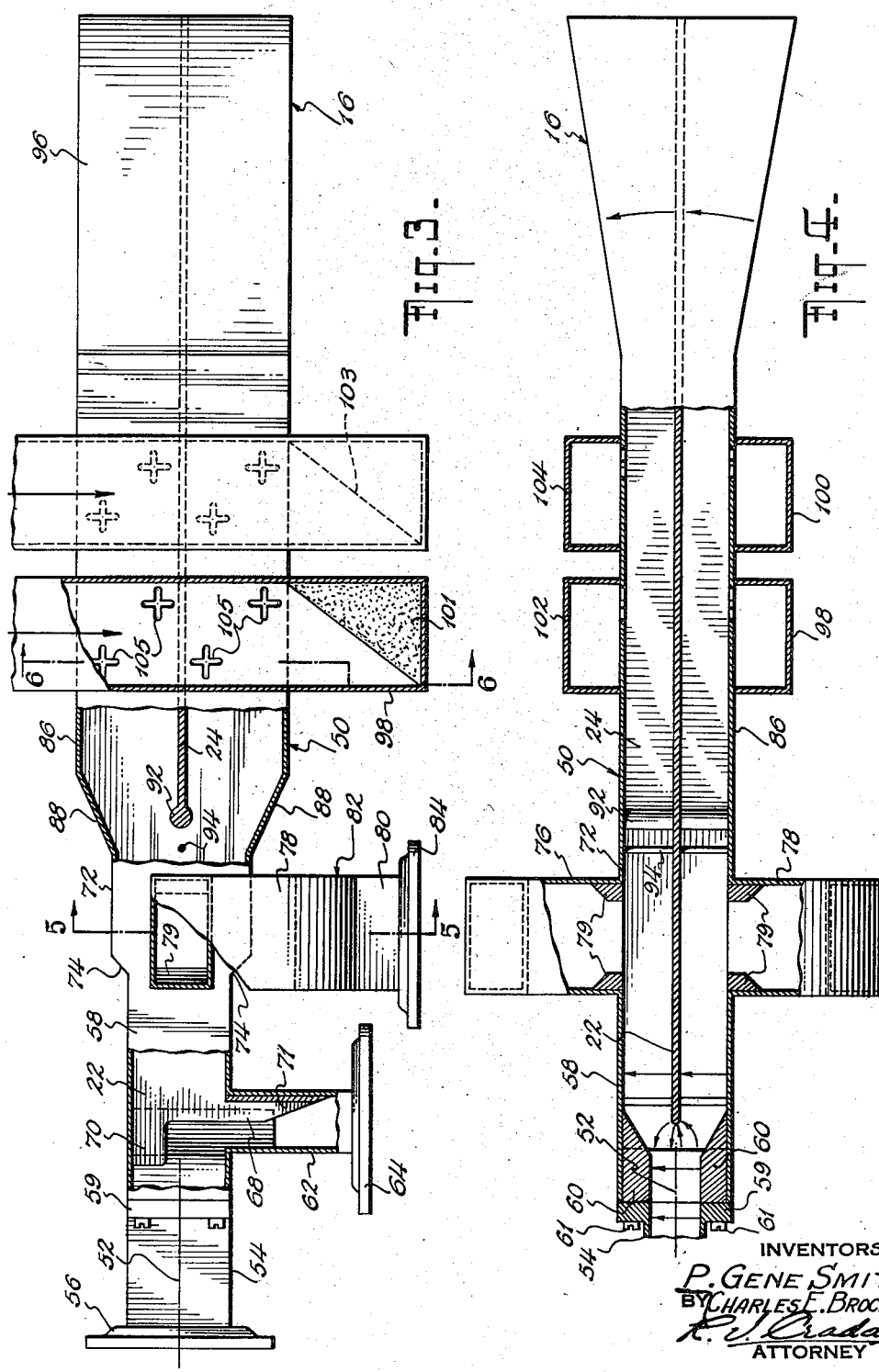

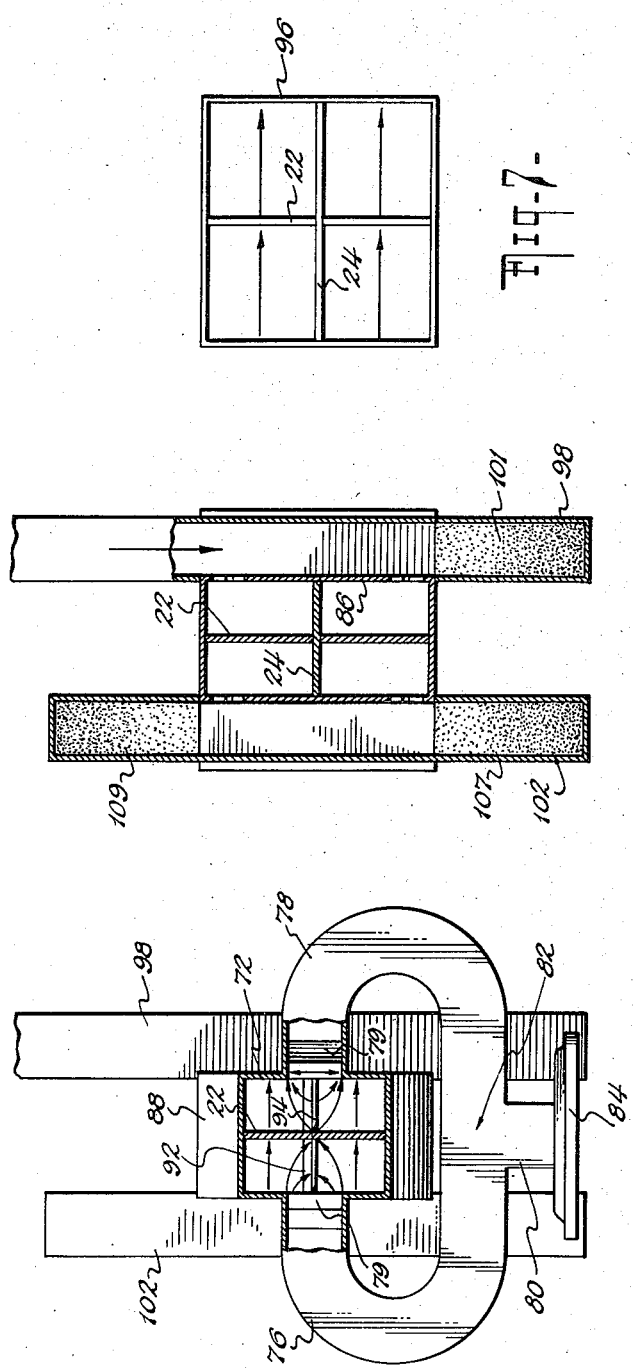

Aug. 14, 1956 P. G. SMITH ET AL 2,759,154
WAVEGUIDE HYBRID NETWORK FOR MONOPULSE COMPARATOR
Filed Nov. 10, 1954 4 Sheets-Sheet 4

INVENTORS
P. GENE SMITH
CHARLES E. BROCKNER
BY
ATTORNEY

United States Patent Office 2,759,154
Patented Aug. 14, 1956

2,759,154

WAVEGUIDE HYBRID NETWORK FOR MONOPULSE COMPARATOR

P. Gene Smith, Northport, and Charles E. Brockner, Amityville, N. Y., assignors to Sperry Rand Corporation, a corporation of Delaware Application November 10, 1954, Serial No. 467,913

14 Claims. (Cl. 333—11)

This invention relates to monopulse radar systems, and more particularly, is concerned with a microwave comparator circuit from which directional information of a target in space is obtained by the comparison of output signals from the comparator produced in response to a reflected signal.

In the so-called monopulse tracking radar system, it is the practice to provide one or two pairs of antenna elements, such as horns, having directive patterns that overlap to define an equal signal axis, generally called the boresight axis. A radar pulse is transmitted simultaneously from each of the antenna elements. A target to the right or left of the boresight axis reflects energy back to each of one pair of horns, the signals in the two horns differing slightly in amplitude and phase angle depending on the angular deviation of the target from the boresight axis. Similarly a target above or below the boresight axis reflects energy to each of the second pair of horns, the signals in the two horns differing in amplitude and phase angle depending on the elevational angle of deviation from the boresight axis. Means, generally referred to as a comparator, is required for producing a first output signal in response to the signals received at each pair of horns that corresponds to their sum and a second signal which corresponds to their difference. The amplitude of the difference signal depends on the strength and on the deviation in the direction of the reflection from the boresight axis, while the sum signal depends solely upon the strength of the reflection. Also, the phase relationship of the difference signal to the sum signal depends on the sense of the deviation, the phase of the difference signal in response to reflection from one side of the boresight axis being reversed with respect to that in response to a similar reflection from the other side of the boresight axis.

It is the practice to utilize a hybrid junction, such as a magic tee or "rat-race," with each pair of horns for separating the sum and difference signals from the associated pair of horns. The result has been a relatively complicated wave guide plumbing circuit which is both clumsy and space consuming, and which is expensive to construct.

It is the general object of this invention to avoid and overcome the foregoing and other difficulties in and objections to the prior art practices by the provision of a microwave comparator circuit for a monopulse radar system which is extremely compact, less complicated in design, more efficient and broader band in operation, and more rugged in construction.

Another object of this invention is the provision of an integral comparator and horn cluster for a monopulse system.

Another object of this invention is to provide a horn radiator in combination with a wave guide comparator circuit in which the horn structure for supplying both azimuth and elevation information occupies a minimum of space.

Another object of this invention is the provision of a wave guide comparator circuit that incorporates means for adding a local oscillator signal and gain control pilot pulses to the incoming signal equally in all channels.

These and other objects of the invention will become apparent from the following specification taken with the accompanying drawings, wherein:

Fig. 3 is a side elevational view, partly in section, of one form of the integral comparator and horn structure;

Fig. 4 is a top view, partly in section, of the structure of Fig. 3;

Fig. 5 is a cross-sectional view taken substantially on the line 5—5 of Fig. 3;

Fig. 6 is a cross-sectional view taken substantially on the line 6—6 of Fig. 3;

Fig. 7 is an end view of the mouth of the horn;

Figure 1:
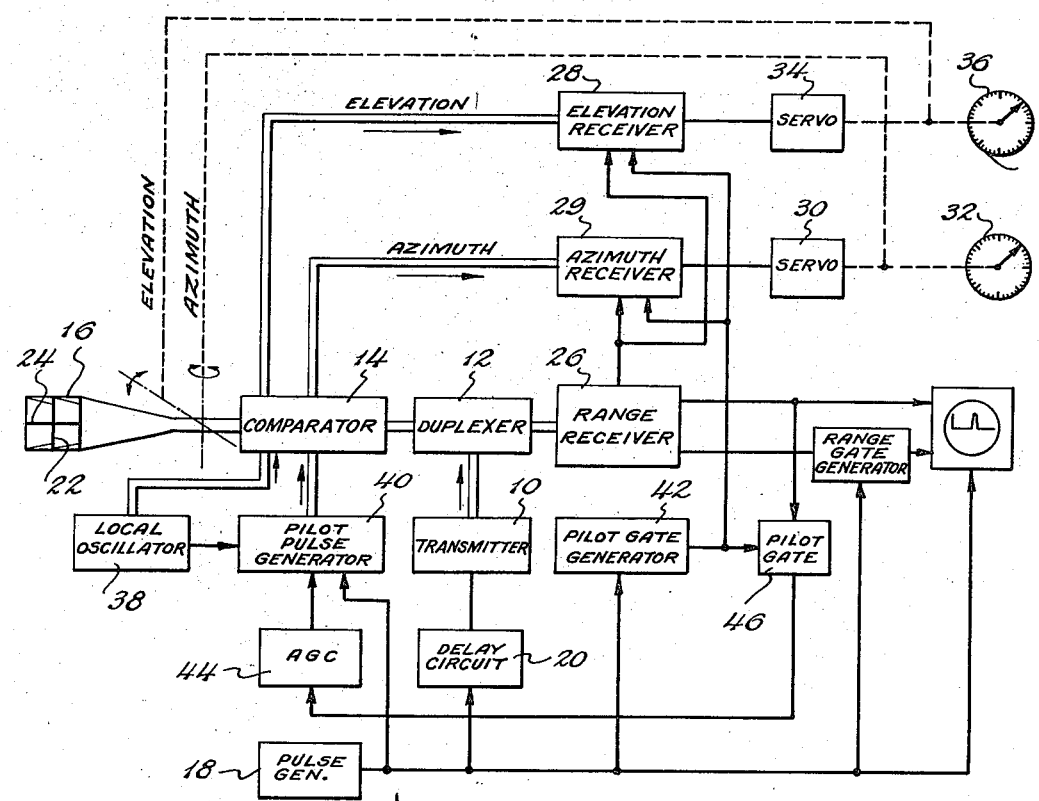
Fig. 1 is a schematic circuit diagram of a monopulse radar system incorporating the horn and comparator of the present invention.

Referring to Fig. 1, the monopulse tracking radar system comprises a microwave transmitter 10 the output of which is coupled by a duplexer 12 through a wave guide comparator circuit 14 to a radiating horn structure 16. The transmitter is pulsed by a pulse generator 18 through a delay circuit 20. The horn 16, in conjunction with a suitable lens or reflector (not shown), when fed energy from the comparator 14, radiates in a symmetrical beam having an axis of symmetry corresponding to the central longitudinal axis of the horn, commonly referred to as the boresight axis. When a pulse is radiated by the horn 16, the energy distribution in either a vertical or horizontal plane is substantially as shown by the curve A of Fig. 2, which is a rectangular coordinate plot of amplitude as a function of angular deviation in one plane from the boresight axis.

The horn 16 is divided into four quadrants by a vertical septum 22 and a horizontal septum 24, the septums acting to provide, in effect, two pairs of horns, an upper and lower pair on either side of the septum 24 and a second pair of horns on either side of the septum 22. A target in space reflects energy from a radiated pulse back to the horn 16, a portion of energy coupling into each of the four quadrants formed by the septums 22 and 24.

The comparator 14 acts, in a manner hereinafter described in more detail, to produce output signals from the received echo pulses equal respectively to the sum of the amplitudes of the energy received in the four quadrants formed by septums, the difference of the amplitudes of the energy received above and below the septum 24, and the difference of the amplitudes of the energy received on either side of the septum 22. The sum signal is coupled to a range receiver 26 through the duplexer 12, while one difference signal is coupled to an elevation receiver 28 and the other difference signal is fed to an azimuth receiver 29.

Figure 2:
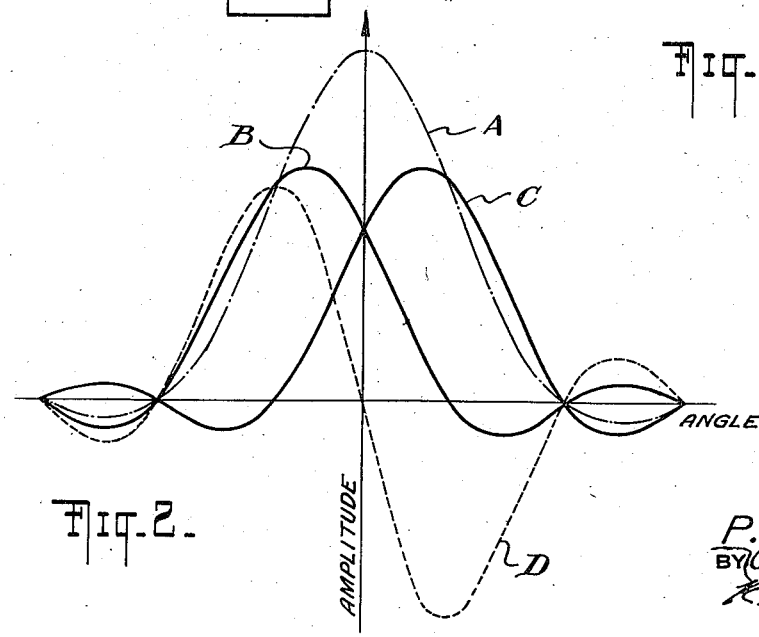
Fig. 2 is a group of waveforms illustrative of the operation of the monopulse radar system and in particular the comparator of the present invention.

Considering for the moment the pair of quadrants on either side of the septum 22 as constituting a pair of horns, the space patterns of these horns are shown by the curves B and C of Fig. 2. A target in space will reflect an echo pulse; the amplitude of the echo pulse at the two horns on either side of the septum 22 can be predicted according to these space pattern curves. The sum of curves B and C is the curve A, which is the space pattern of the horn 16 as a unit. Curve A therefore indicates the amplitude sum of the echo pulse as received on either side of the septum 22.

The difference between the curves B and C is shown in curve D, the negative amplitude portion indicating the phase reversal that takes place when the relative amplitudes at the pair of horns changes on either side of the boresight axis. It is this phase reversal that indicates whether the target is on one side or the other of the boresight axis, as by comparing the sum signal with the difference signal. The curves of Fig. 2 apply equally to the pair of horns defined by the septum 24 for deriving elevation information.

Thus it will be seen that when an echo pulse is received from a point on the boresight axis, the amplitude of the difference signal is zero while the amplitude of the sum signal depends on the strength of the reflection. When an echo pulse is received from a point off the boresight axis, but within the overall directive pattern, the sum signal still depends substantially only on the strength of the reflection. However, the amplitude of the difference signal depends both on the strength and on the deviation in the direction of the reflection from the boresight axis, and the phase relationship of the difference signal to the sum signal depends on the sense of the deviation; that is, the phase of the difference signal in response to a reflection from one side of the boresight axis is reversed with respect to that in response to a similar reflection from the other side of the boresight axis. Of course the same applies for a point of reflection above or below the boresight axis.

The amplified sum signal from the receiver 26 is fed to the receivers 28 and 29. For simplicity only the action of the azimuth control will be described, the elevation control being identical. At the azimuth receiver 29, the sum signal is compared with the difference signal in a phase detector. An automatic gain control in the receiver 26 maintains the output fed to the phase detector in the receiver 29 substantially constant in amplitude regardless of changes in amplitude in the echo pulse reflected by the target. An automatic gain control system associated with the receiver 29 maintains a constant ratio between the gain of the azimuth receiver 29 and the gain of the range receiver 26, so that the changes in amplitude at the phase detector of the receiver 29 depend solely upon the changes in amplitude of the echo pulse due to angular deviation of the target from the boresight axis. Thus the output from the azimuth receiver 29 is a signal that varies in amplitude in response to the angular deviation and reverses in polarity depending on whether the target is to the right or left of the boresight axis.

This signal is fed to a servo 30 which is mechanically linked to the horn 16. The horn 16 is pivotally supported for movement in azimuth and elevation, the servo 30 rotating the horn 16 in azimuth until a null is reached by centering the target in the vertical plane through the boresight axis. An indicator 32 shows the angular position of the horn 16 when it is centered on the target, thus indicating the azimuth angle of the target.

In a similar manner the output of the elevation receiver 28 actuates a servo 34 to position the horn 16 in elevation, an indicator 36 showing the elevation of the target when the target is aligned with the boresight axis of the horn 16.

One feature of the present invention is that the comparator 14 is also utilized as a mixer, in a manner hereinafter more fully described. A local oscillator 38 is coupled to the comparator 14 for mixing with the incoming signals before they are fed to the I.-F. amplifiers of the receivers 26, 28 and 29. Another feature of the present invention is that pilot pulses can be injected at the comparator 14 for the purpose of controlling the gain of the receivers 28 and 29 after the manner taught in the copending application S. N. 367,253 by Robert I. Jacobson and Ralph Deutsch, filed July 10, 1953.

To control the gain of the receivers 28 and 29, in accordance with the teaching of the above-identified application, pilot pulses of the same frequency as the transmitter 10 are fed to the receivers 28 and 29. The pilot pulses are injected at the comparator 14. They are generated by a pilot pulse generator 40 triggered from the pulse generator 18, the delay circuit 20 insuring that the pilot pulses occur just before the transmitted pulses, so that the pilot pulses are injected in the "dead" time between the end of each range sweep and the beginning of the next. The receivers 28 and 29 include automatic gain control circuits which are gated on by a pilot gate generator 42 synchronized from the pulse generator 18, so that the automatic gain control circuits of the receivers 28 and 29 respond only to the pilot pulses from the pulse generator 40. The amplitude of the pilot pulses from the generator 40 in turn are controlled by an automatic gain control circuit 44 in response to the output of the range receiver 26, a pilot gate 46 controlled from the pilot gate generator 42 connecting the automatic gain control 44 to the output of receiver 26 so that the pilot pulse generator is regulated solely in response to the pilot pulse output from the range receiver 26.

Thus the pilot pulse generator output amplitude is inversely proportional to the gain of the range receiver 26. Since this gain is controlled in response to the echo pulses to provide a constant amplitude echo pulse output, the pilot pulses from the generator 31 bear a constant amplitude ratio to the received echo pulse. This ratio is the same as the ratio of the pilot pulse to the echo pulse at the output of the range receiver 26. Thus the gains of the receivers 28 and 29 are automatically controlled to maintain the pilot pulse output of the receivers 28 and 29 at a substantially constant amplitude. This requires that the gain of the receivers 28 and 29 be inversely proportional to the amplitude of the pilot pulse. Since this input amplitude bears a fixed ratio to that of the received echo pulse, the gain of the azimuth and elevation channels will vary inversely with variations in the echo pulse amplitude in exactly the same manner as the gain of the range channel. This makes the echo pulse output from the phase detectors of the receivers 28 and 29 independent of the strength of the reflected echo signals, and dependent only on the deviation of the reflecting target from the boresight axis.

Referring to Figs. 3–7, there is shown an embodiment of a comparator 14 and an integral horn 16 constructed according to the principles of the present invention. The numeral 50 indicates generally a hollow conductive pipe having a central longitudinal axis 52. The pipe 50 comprises a plurality of sections which are rectangular in cross-section but of differing proportions. The input end, which is also the range output, comprises a first section 54 of standard wave guide proportions and having a coupling flange 56 for coupling to a wave guide transmission line.

Adjacent this first section 54 is a substantially square second section 58 having internal dimensions equal to the broad dimension of the rectangular first section 54. A pair of tapered blocks 60 provide a smooth transition between the narrow dimension of the rectangular first section 54 and the broader dimension of the substantially square second portion 58 where they are joined, as by means of a flange 59 integral with the section 54 and screws 61. A branch rectangular wave guide section 62 is joined at one end to the wall of the pipe 50 corresponding to the narrow wall of the rectangular input section 54. The branch wave guide 62 forms a T-junction with the pipe 50 in the region of the transition between the rectangular first section 54 and the square second section 58. A coupling flange 64 secured to the opposite end of the branch wave guide section 62 is provided for connecting to a wave guide transmission line.

A septum 22, corresponding to the vertical septum 22 of Fig. 1, extends between one pair of opposite walls of the pipe 50, the septum 22 lying in the plane defined by the intersecting longitudinal axes of the pipe 50 and branch wave guide 62. The septum 22 terminates in the region of the junction with the branch wave guide 62, a portion 68 of the septum 22 projecting into the branch wave guide 62. Another portion 70 of the septum 22 projects into the first section 54. The inner narrow dimension of the branch wave guide 62 is reduced, as by a plate 71, to improve the impedance match at the junction. The branch wave guide 62, input wave guide section 54, and a pair of wave guides formed by the septum 22 within the square section 58 of the hollow pipe 50 constitute respectively the shunt arm, series arm, and "collinear" arms of a folded type magic-T junction, such as described and claimed in the copending application S. N. 352,244 filed April 30, 1953, by P. Gene Smith.

Adjacent the substantially square section 58 of the pipe 50 is a rectangular third section 72, which is widest in the dimension parallel to the septum 22, the widest dimension being such as to be above cut-off for the TE$_{20}$ mode at the normal frequency of operation of the monopulse radar system. The third section 72 of the pipe 50 is joined to the square portion 58 by flaring the walls of the pipe 50, as indicated at 74, to provide a smooth transition between the sections 58 and 72.

A pair of branch wave guides 76 and 78 are joined to the pipe 50 in the region of the third section 72 thereof, as shown. The wave guides 76 and 78 are joined to the walls of the pipe 50 which are parallel to the septum 22, with the wide dimension of the rectangular wave guides 76 and 78 extending in the direction of the longitudinal axis 52 of the pipe 50. Tapered conductive elements 79 are positioned in the wave guides 76 and 78 at the junction with the section 72 to provide impedance transformation therebetween. The wave guides 76 and 78 are each curved through 180°, as best shown in Fig. 5, and are joined to each other and an output wave guide section 80 in a T-junction indicated generally at 82. A flange 84 is provided on the end of the wave guide section 80 for coupling to a suitable wave guide transmission line. Conventional impedance matching means may be utilized in the T-junction to improve the matching characteristics.

Following the third section 72 of the pipe 50 is a fourth section 86 which is substantially twice the width of the first section 54 in the dimension parallel to the septum 22. The walls of the pipe 50 are flared, as indicated at 88, to provide a smooth transition between the section 72 and the section 86.

A septum 24, corresponding to the septum 24 of Fig. 1, extends between opposite walls of the pipe 50 at right angles to the septum 22, dividing the section 86 into four rectangular wave guide quadrants. The septum 24 is terminated in a post 92 between the sections 72 and 86 of the wave guide 50. A rod 94 extends parallel to the edge of the septum 90 in the same plane, the rod 94 and post 92 serving to reduce the reflections which otherwise would be produced by the inner edge of the septum 24.

The pipe 50 has a tapered section 96 which is flared to form the radiating horn 16. The pipe 50 is terminated by the tapered section 96 in a mouth that is substantially square in cross-section and which is divided in four quadrants by the septums 22 and 24, as best seen in Fig. 7.

For injection of the local oscillator signal and the pilot pulses, four wave guide sections 98, 100, 102 and 104 are provided, the wave guide sections 98 and 100 being secured to one wall of the pipe 50 and the wave guide sections 102 and 104 being secured to the opposite wall of the pipe 50 in the region of the section 86. These wave guide sections are joined to the broad wall of the fourth section 86 of the hollow pipe 50 to form a plurality of directional couplers with the four wave guide quadrants formed by the septums 22 and 24. The directional couplers are preferably of the cross-guide type having a pair of crossed slot apertures, indicated at 105, along the diagonals, in the manner taught in Patent No. 2,602,859 by T. Moreno. While two couplers, one for the local oscillator injection and one for the pilot pulse injection, would be sufficient for injecting these signals, a pair of couplers in each of the four wave guide quadrants is provided for electrical symmetry. The wave guide 98 is connected to the pilot pulse generator 40, while the wave guide 100 is connected to the local oscillator 38. The wave guides 98 and 100 have matched terminations 101 and 103, respectively. The wave guides 102 and 104 are terminated in matched loads 107 and 109 at the respective ends thereof.

Operation of the above described comparator can be best understood by considering the effect of a target positioned on the boresight axis. The echo pulse, in such case, excites energy in each of the four quadrants equally, as represented by the four equal vectors in Fig. 7. As these signals excited by the echo pulse are transmitted along the pipe 50, they couple into the square section 58, as best seen in Fig. 5, because of their symmetry. However, they couple no energy into the branch wave guides 76 and 78, since the electric vectors extending across the mouths of each of the wave guides 76 and 78 are equal in amplitude and opposite in phase, and therefore cancel each other, as shown by the vector arrows in Fig. 5.

At the junction with the branch wave guide 62, the signals in the section 58 couple into the input section 54. Because of their symmetry they add, together with the resulting electric vector extending across the input section 54 in the manner of the dominant TE$_{10}$ mode. However, they couple no energy into the branch wave guide 62, since the electric vectors extending across the mouth of the wave guide 62 from the wave guides in the section 58 are equal in amplitude and opposite in phase, as best shown by the arrows in Fig. 4. Thus all the energy from the echo pulse is transmitted to the input section 54 from which it is coupled to the range receiver. No energy is coupled to the azimuth and elevation receivers.

Consider now a target to the right or left of the boresight axis. The signals to the right and left of the septum 22 are then not equal in amplitude, as shown by the space pattern curves of Fig. 2. The vector arrows of Fig. 7 to the left of the septum 22 are not equal in length to the vector arrows to the right of the septum. This does not change the symmetry about the septum 24, so that the vectors shown in Fig. 5 are still substantially as shown for a target on the boresight axis, and complete cancellation in the branch wave guides 76 and 78 takes place.

However, at the branch wave guide 62, the vectors to the right of the septum 22 are different in length than the vectors to the left, so they do not cancel, but a net vector, equal to their difference, extends across the mouth of the branch wave guide 62. Thus a signal of amplitude equal to the difference in amplitude of the signals to the right and left of the septum 22 is excited in the branch wave guide 62. It will be seen that the phase of the difference signal, as represented by the direction of the net vector, depends on which of the signals on either side of the septum 22 is larger.

Similarly a target above or below the septum 24 changes the relative length of the vector arrows in Fig. 7 above and below the septum 24. This changes the symmetry of the vectors at the junction of the wave guides 76 and 78, but not at the junction of wave guide 62. Since the vector arrows above and below the septum 24, as seen in Fig. 5, are not equal in length, net vectors extend across the mouths of the wave guides 76 and 78 equal in length to the difference in amplitude of the signals above and below the septum 24. Again the phase of the resulting difference signals in the wave guides 76 and 78, as represented by the direction of the net vectors, depends on which of the signals on either side of the septum 24 is the larger.

It will be appreciated that the branch wave guides 76 and 78 form series arms of what constitutes a pair of magic tee junctions. These junctions further include shunt arms in the section 58 on either side of the septum 22, and pairs of "collinear" arms in the section 86 on either side of the septum 24. Energy does not couple between the series and shunt arms, or between the collinear arms. Energy couples between the shunt arm and in-phase components in the collinear arms and between the series arm and 180° out of phase components in the collinear arms.

Figure 10:
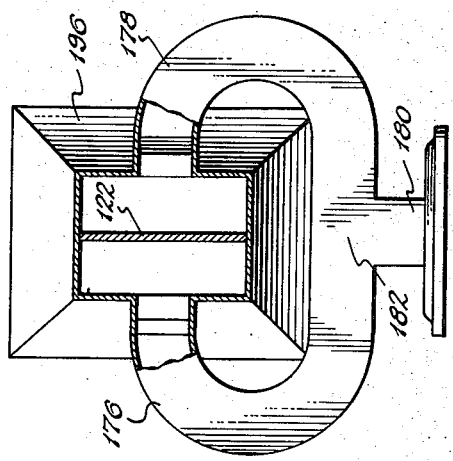
Fig. 10 is a sectional view taken substantially on the line 10—10 of Fig. 8.
Figure 8:
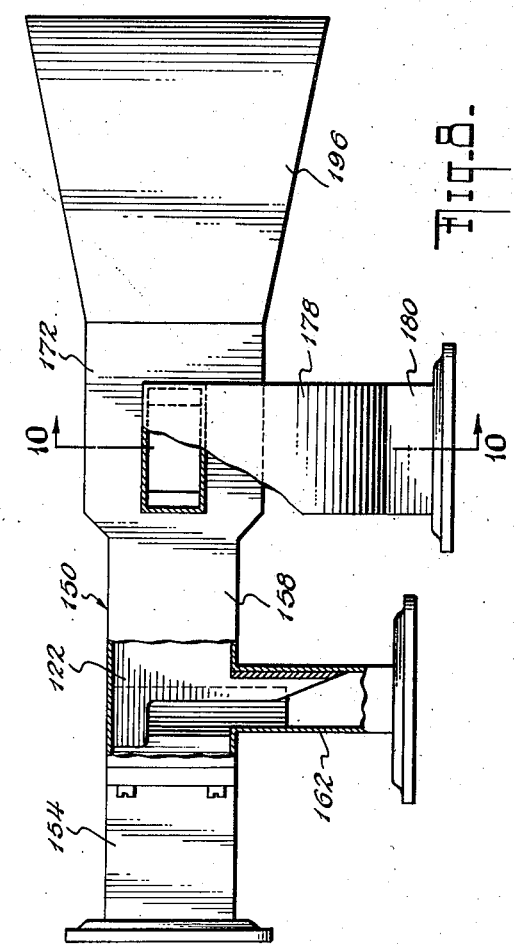
Fig. 8 is a side elevational view, partly in section, of a modified embodiment of an integral comparator and horn structure.
Figure 9:
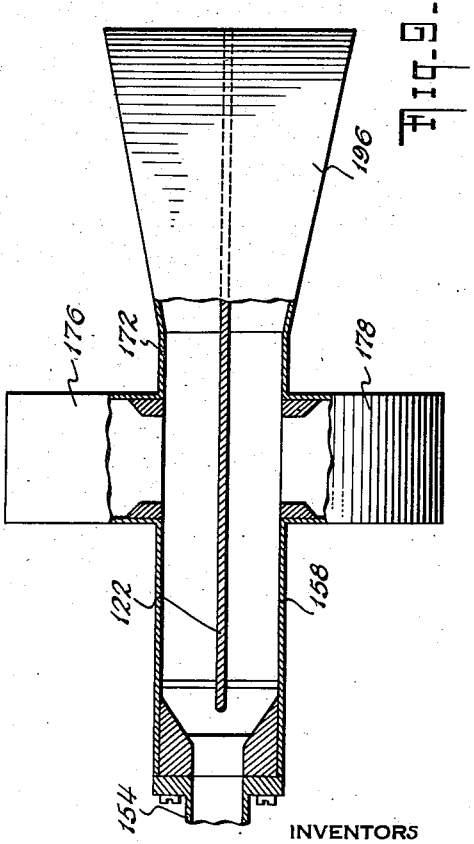
Fig. 9 is a top view, partly in section, of the same embodiment of Fig. 8.

The output of the wave guide 62, which has an amplitude determined by the difference in amplitude of the signals produced by the echo pulse on either side of the septum 22, is coupled to the azimuth receiver 29. The outputs of the wave guides 76 and 78, which have amplitudes determined by the difference in amplitude of the signals on either side of the septum 24, are coupled to the elevation receiver after being combined by the T-junction 82.

Where pilot pulse and local oscillator signal injection are not desired, the comparator modification above described can be somewhat simplified in the manner shown in the modification of Figs. 8–10. The portion of the comparator including the elevation and azimuth junctions is identical to the comparator as above described, and includes a hollow pipe 150 having a rectangular input section 154, a first branch wave guide 162, and a substantially square second section 158 of the pipe 150. The input section 154, branch wave guide 162, and second section 158 are joined as heretofore described. A third section 172, wider in one dimension than the section 158, has joined thereto a pair of wave guide sections 176 and 178 in the identical manner as described in connection with Figs. 3–7. The wave guides 176 and 178 are joined in a T-junction 182 to a wave guide 189. A septum 122 is positioned in the pipe 150 and terminates in the region of the junction with the branch wave guide 162.

A portion of the pipe 150 forming the horn mouth, however, is joined directly to the third section 172, and constitutes a double flaring portion 196 terminating in a substantially square mouth. In the modification of Figs. 8–10, moreover, the second septum is eliminated, thus obviating the matching problem, of the first described embodiment, involved in preventing reflections at the inner termination of the septum 24, as by the post 92 and rod 94.

The operation of the comparator is substantially unaffected by the elimination of the second septum. The target on the boresight axis reflects an echo pulse which excites a reflection signal in the two horns formed by the septum 122. Where before there were in effect four wave guide sections propagating in the $TE_{10}$ mode, in the presently described version of the comparator there are only two wave guide sections propagating in the dominant $TE_{10}$ mode. The symmetry of the electric vectors, however, is the same as in the two-septum arrangement. As before, the dominant mode does not excite energy in the branch wave guides 162, 176 or 178, all the energy being coupled to the range receiver through the input wave guide section 154. A target to the right or left of the boresight axis merely changes the relative amplitude of the two signals excited by the echo pulse on either side of the septum 122, resulting in a different signal being coupled into the branch wave guide 162 in the identical manner as heretofore described.

The echo pulse from a target above or below the boresight axis excites not only the dominant $TE_{10}$ mode in the two wave guide sections formed by the septum 122, but also excites the second order $TE_{20}$ mode, which the two wave guide sections are wide enough to support. The second order mode couples to the wave guides 176 and 178, but not to the wave guide 162 or input section 154, since the section 158 is dimensioned below cut-off for the $TE_{20}$ mode.

It is theoretically possible to use some kind of signal injection with the comparator of Figs. 8–10 by coupling equally to the $TE_{10}$ and $TE_{20}$ modes. However, because of the different phase velocities of the two modes, this is difficult to do and maintain equal amplitude of coupling and fixed phase relationship between these two modes over any reasonably wide frequency band. This is not a problem in the four quadrant configuration, since the four signals excited by the echo pulse are propagated in the four wave guide sections with equal phase velocities for all target positions.

From the above description it will be seen that the various objects of the invention have been achieved by the provisions of a compact wave guide comparator and radiator for use with a monopulse radar system. Both the two-horn and four-horn modifications give range, elevation, and azimuth information through separate channels. The comparator as described is relatively broad band in its operation and introduces negligible reflection in any of the three channels.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a monopulse radar system, a wave guide comparator circuit comprising a first hollow pipe including a plurality of rectangular sections positioned along a common central longitudinal axis, a first section of the pipe having a pair of narrow walls and a pair of broad walls, a second section having four walls of width substantially equal to the width of the broad walls of the first section, a third section having a pair of narrow walls and a pair of broad walls, a fourth section having a pair of narrow walls and a pair of walls broader than said broad walls of the third section, one pair of opposite walls of said second section lying in a common plane and contiguous with the pair of narrow walls of the first section and the other pair of opposite walls of the second section lying in a common plane and contiguous with the pair of broad walls of the third and fourth sections, tapered hollow pipe sections joining the several rectangular sections to form said first hollow pipe, and an open-ended flaring horn section of rectangular cross-section joined to said fourth section; a first continuous septum extending between and joined to opposite walls in the second, third, fourth, and flaring sections of the pipe in a plane passing through the central axis of the pipe, the first septum being parallel to the broad walls of the third and fourth sections of the pipe; a second continuous septum extending between and joined to opposite walls in the fourth section and flaring section of the pipe in a plane passing through the central axis, the second septum being perpendicular to the first septum; a second hollow rectangular pipe joined at one end thereof to one wall of the first pipe in the region of the tapered section between the first and second sections of the first pipe to form a T-junction therewith, the longitudinal axes of the first and second pipe intersecting substantially at right angles, the longitudinal axis of the second pipe lying in the plane of the first septum; a third hollow rectangular pipe having the ends thereof joined respectively to the opposite broad walls of the third section of the first pipe, the longitudinal axes of the first pipe and third pipe intersecting at right angles to each other and to the plane of the first septum, and energy coupling means connected to the third pipe for coupling energy into and out of the third pipe; and a plurality of wave guide sections joined along their longitudinal extent to at least one of the broad walls of the fourth section of the first pipe, and directional coupling means between the fourth section of the first pipe and each of said wave guides, said means being positioned to couple each of the wave guides to the first pipe on both sides of the second septum.

2. In a monopulse radar system, a wave guide comparator circuit comprising a first hollow pipe including a plurality of rectangular sections positioned along a common central longitudinal axis, a first section of the pipe having a pair of narrow walls and a pair of broad walls, a second section having four walls of width substantially equal to the width of the broad walls of the first section, a third section having a pair of narrow walls and a pair of broad walls, one pair of opposite walls of said second section lying in a common plane and contiguous with the pair of narrow walls of the first section and the other pair of opposite walls of the second section lying in a common plane and contiguous with the pair of broad walls of the third section, tapered hollow pipe sections joining the several rectangular sections to form said first hollow pipe, and an open-ended flaring horn section of rectangular cross-section joined to said third section; a continuous septum extending between and joined to opposite walls in the second, third, and flaring sections of the pipe in a plane passing through the central axis of the pipe, the septum being parallel to the broad walls of the third section of the pipe; a second hollow rectangular pipe joined at one end thereof to one wall of the first pipe in the region of the tapered section between the first and second sections of the first pipe to form a T-junction therewith, the longitudinal axes of the first and second pipes intersecting substantially at right angles, the longitudinal axis of the second pipe lying in the plane of the septum; and a third hollow rectangular pipe having the ends thereof joined respectively to the opposite broad walls of the third section of the first pipe, the longitudinal axes of the first pipe and third pipe intersecting at right angles to each other and to the plane of the septum, and energy coupling means connected to the third pipe for coupling energy into and out of the third pipe.

3. In a monopulse radar system, a wave guide comparator circuit comprising a first hollow pipe including a plurality of rectangular sections positioned along a common central longitudinal axis, a first section of the pipe having a pair of narrow walls and a pair of broad walls, a second section having a pair of opposite walls of width substantially equal to the width of the broad walls of the first section, and a pair of opposite walls of width substantially twice the width of the narrow walls of said first section, a third section having a pair of narrow walls and a pair of broad walls, a fourth section having a pair of narrow walls and a pair of walls broader than said broad walls of the third section, tapered hollow pipe sections joining the several rectangular sections to form said first hollow pipe, and an open-ended flaring horn section of rectangular cross-section joined to said fourth section; a first continuous septum extending between and joined to opposite walls in the second, third, fourth, and flaring sections of the pipe in a plane passing through the central axis of the pipe, the first septum being parallel to the broad walls of the third and fourth sections of the pipe; a second continuous septum extending between and joined to opposite walls in the fourth section and flaring section of the pipe in a plane passing through the central axis, the second septum being perpendicular to the first septum; a second hollow rectangular pipe joined to one end thereof to one wall of the first pipe in the region of the tapered section between the first and second sections of the first pipe to form a T-junction therewith, the longitudinal axes of the first and second pipes intersecting substantially at right angles, the longitudinal axis of the second pipe lying in the plane of the first septum; a third hollow rectangular pipe having the ends thereof joined respectively to the opposite broad walls of the third section of the first pipe, the longitudinal axes of the first pipe and third pipe intersecting at right angles to each other and to the plane of the first septum, and energy coupling means connected to the third pipe for coupling energy into and out of the third pipe; and a plurality of wave guide sections joined along their longitudinal extent to at least one of the broad walls of the fourth section of the first pipe, and directional coupling means between the fourth section of the first pipe and each of said wave guides, said means being positioned to couple each of the wave guides to the first pipe on both sides of the second septum.

4. A wave guide comparator circuit comprising a first rectangular wave guide section, a pair of parallel rectangular wave guide sections having a common broad wall therebetween parallel to the planes of the broad walls of the first wave guide section, a tapered wave guide section joining said parallel sections to said first section, said common wall extending partially into the tapered section, a first branch wave guide coupled at one end into the tapered wave guide section, the branch wave guide having a longitudinal axis lying in the plane of said common wall, said parallel wave guide sections having an increased broad dimension at the ends thereof remote from said tapered section, second and third branch wave guides coupled respectively to the pair of parallel wave guide sections adjacent the broadest ends of the pair of parallel wave guide sections, the second and third branch wave guides having longitudinal axes extending at right angles to said common wall, four parallel rectangular wave guide sections arranged so that each wave guide has two adjacent broad and narrow walls in common with corresponding walls of two of the other three parallel wave guides, the broad walls of said four parallel wave guides being parallel to each other and parallel to the plane of the broad walls of said first wave guide section, directional coupling means connected to each of said four parallel wave guides in the walls thereof, and directional radiating means coupled to one end of each of said four parallel wave guides, and a pair of tapered wave guide sections, each of said pair of tapered sections joining a respective pair of said four parallel wave guides to the broadest end of a respective one of said pair of parallel wave guide sections.

5. A wave guide comparator circuit comprising a first rectangular wave guide section, a pair of parallel rectangular wave guide sections having the broad walls thereof parallel to the planes of the broad walls of the first wave guide section, a tapered wave guide section joining said parallel sections to said first section, a first branch wave guide coupled at one end to the tapered wave guide section, the branch wave guide having a longitudinal axis parallel to the planes of said broad walls, said parallel wave guide sections having an increased broad dimension at the ends thereof remote from said tapered section, second and third branch wave guides coupled respectively to the pair of parallel wave guide sections adjacent the broadest ends of the pair of parallel wave guide sections, the second and third branch wave guides having longitudinal axes extending at right angles to said broad walls, four parallel rectangular wave guide sections, the broad walls of said four parallel wave guides being parallel to each other and parallel to the plane of the broad walls of said first wave guide section, directional radiating means coupled to one end of each of said four parallel wave guides, and a pair of tapered wave guide sections, each of said pair of tapered sections joining a respective pair of said four parallel wave guides to the broadest end of a respective one of said pair of parallel wave guide sections.

6. A wave guide comparator circuit comprising a first rectangular wave guide section, a pair of parallel rectangular wave guide sections having the broad walls thereof parallel to the planes of the broad walls of the first wave guide section, a tapered wave guide section joining said parallel sections to said first section, a first branch wave guide coupled at one end to the tapered wave guide section, the branch wave guide having a longitudinal axis parallel to the planes of said broad walls, said parallel wave guide sections having an increased broad dimension at the ends thereof remote from said tapered section, second and third branch wave guides coupled respectively to the pair of parallel wave guide sections adjacent the broadest ends of the pair of parallel wave guide sections, the second and third branch wave guides having longitudinal axes extending at right angles to said broad walls, and directional radiating means coupled to the broadest end of each of said pair of parallel wave guide sections, said radiating means coupling to both the dominate $TE_{10}$ and second order $TE_{20}$ modes of propagation within the broadest ends of said pair of parallel wave guide sections.

7. Apparatus comprising first and second rectangular wave guides, said wave guides each having a pair of broad walls and a pair of narrow walls, one of the walls being common to both wave guides, said wave guides each having a narrow portion and wide portion, said portions being respectively below and above cut-off for energy propagated in the second order $TE_{20}$ mode, radiating means coupled to the wide portion of each of the wave guides, means coupled to the wide portions of the wave guides responsive only to the second order $TE_{20}$ mode of propagation in said wave guides, and a folded magic tee wave guide junction including a pair of parallel wave guide arms contiguous with the narrow portions of said wave guides, a series wave guide arm substantially aligned with said parallel arms, and a shunt wave guide arm extending at right angles to the parallel arms and series arm at the common junction therebetween.

8. Apparatus comprising a first wave guide section, a first pair of wave guide sections extending parallel to each other with a common wall therebetween and substantially aligned with the first section, first wave guide junction means connecting one end of the first section to the adjacent ends of the aligned first parallel pair of sections, a first branch wave guide section joined at one end thereof to said first wave guide junction means to form a T-junction therewith, a second pair of parallel wave guide sections having a common wall therebetween and substantially aligned with one of said first pair of parallel wave guide sections, second wave guide junction means connecting said one of the first pair of parallel wave guide sections to the adjacent ends of the aligned second pair of parallel wave guide sections, a second branch wave guide section joined at one end and thereof to said second wave guide junction means to form a T-junction therewith, a third pair of parallel wave guide sections having a common wall therebetween and a common wall with said second pair of parallel wave guide sections, the third pair of parallel wave guide sections being substantially aligned with the other of the first pair of parallel wave guide sections, third wave guide junction means connecting said other of the first pair of parallel wave guide sections, a second branch wave guide section joined at one end thereof to said third wave guide junction means to form a T-junction therewith, an output wave guide section, fourth wave guide junction means connecting said second and third branch wave guide sections to said output wave guide section, and radiating horn means including four wave guide sections connected respectively to the wave guide sections of said second and third pair of parallel wave guide sections.

9. Apparatus comprising a first wave guide section, a first pair of wave guide sections extending parallel to each other with a common wall therebetween and substantially aligned with the first section, first wave guide junction means connecting one end of the first section to the adjacent ends of the aligned first parallel pair of sections, a first branch wave guide section joined at one end thereof to said first wave guide junction means to form a T-junction therewith, a second pair of parallel wave guide sections having a common wall therebetween and substantially aligned with one of said first pair of parallel wave guide sections, second wave guide junction means connecting said one of the first pair of parallel wave guide sections to the adjacent ends of the aligned second pair of parallel wave guide sections, a second branch wave guide section joined at one end thereof to said second wave guide junction means to form a T-junction therewith, a third pair of parallel wave guide sections having a common wall therebetween and a common wall with said second pair of parallel wave guide sections, the third pair of parallel wave guide sections being substantially aligned with the other of the first pair of parallel wave guide sections, third wave guide junction means connecting said other of the first pair of parallel wave guide sections to the adjacent ends of the aligned third pair of parallel wave guide sections, and a second branch wave guide section joined at one end thereof to said third wave guide junction means to form a T-junction therewith.

10. Apparatus comprising a first folded magic tee junction including a series arm, a pair of parallel arms substantially aligned with the series arm, and a shunt arm extending perpendicularly to said series arm and parallel arms, a second folded magic tee junction including a shunt arm joined to one of said parallel arms of the first junction, a pair of parallel arms substantially aligned with the shunt arm, and a series arm extending perpendicularly to said shunt arm, and a third folded magic tee junction including a shunt arm joined to the other of said parallel arms of the first junction, a pair of parallel arms substantially aligned with the shunt arm, and a series arm extending perpendicularly to said shunt arm, the parallel arms of the second junction and parallel arms of the third junction having a common wall therebetween.

11. Apparatus as defined in claim 10 further including means for coupling the series arms of said second and third junctions together, and means connected to said last-named means for coupling energy into and out of said second junction and said third junction.

12. Apparatus as defined in claim 11 further including radiating means coupled to each of said parallel arms of the second junction and third junction.

13. Microwave apparatus comprising a first magic tee junction including four wave guide arms, two of said arms being parallel to each other with a common wall between, a second magic tee junction including four wave guide arms, one of said arms being contiguous with one of the parallel arms of the first magic tee junction and two others of said arms being parallel to each other with a common wall between, and a third magic tee junction including four wave guide arms, one of said arms being contiguous with the other of the parallel arms of the first magic tee junction, and two other of said arms being parallel to each other with a common wall between, the second junction and third junction having a common wall therebetween.

14. Microwave apparatus comprising a first magic tee junction including four wave guide arms, two of said arms being parallel to each other with a common wall between, a second magic tee junction including three wave guide arms, one of said arms being contiguous with one of the parallel arms of the first magic tee junction and another of said arms being substantially twice as broad as the other two arms for propagating in the $TE_{20}$ mode, and a third magic tee junction including three wave guide arms, one of said arms being contiguous with the other of the parallel arms of the first magic tee junction and another of said arms being substantially twice as broad as the other two arms for propagating in the $TE_{20}$ mode, the second junction and third junction having a common wall therebetween.

References Cited in the file of this patent

UNITED STATES PATENTS 2,643,295    Lippman _____ June 23, 1953

OTHER REFERENCES

Advertising folder by Hughes Research & Development Labs., Microwave Lab., Culver City, Calif., describing Model H hybrid junction. Received in Div. 69, June 29, 1954. (Copy in 333—11.)